(12) United States Patent
Painter et al.

(10) Patent No.: US 12,140,267 B2
(45) Date of Patent: Nov. 12, 2024

(54) DEVICE-TO-MOUNT ROTATIONAL COUPLING MOUNTING PLATFORM

(71) Applicant: T-Mobile USA, Inc., Bellevue, WA (US)

(72) Inventors: Christopher Painter, Kirkland, WA (US); Joseph Baird, Kent, WA (US); Parag Garg, Woodinville, WA (US); Kenneth Chou, Oakland, CA (US); Michael Lo, San Francisco, CA (US); William Carter-Giannini, San Jose, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/109,501

(22) Filed: Feb. 14, 2023

(65) Prior Publication Data

US 2023/0194041 A1 Jun. 22, 2023

Related U.S. Application Data

(62) Division of application No. 16/872,808, filed on May 12, 2020, now Pat. No. 11,608,929.

(Continued)

(51) Int. Cl.
*F16M 11/04* (2006.01)
*F16B 1/00* (2006.01)
(Continued)

(52) U.S. Cl.
CPC .............. *F16M 11/041* (2013.01); *F16B 1/00* (2013.01); *F16M 13/00* (2013.01); *H04M 1/11* (2013.01);
(Continued)

(58) Field of Classification Search
CPC ....... F16M 2200/028; F16M 2200/024; F16M 13/00; F16M 11/041; H04M 1/11;
(Continued)

(56) References Cited

U.S. PATENT DOCUMENTS

D98,696 S 2/1936 Rogers
3,443,783 A 5/1969 Fisher
(Continued)

OTHER PUBLICATIONS

Gearlab Harman Kardon Onyx Studio 4 Review, publication date Feb. 18, 2018, (online) URL:https://www.techgearlab.com/reviews/audio/bluetooth-speaker/harman kardon-onyx:-studio-4 (Year: 2018).

(Continued)

*Primary Examiner* — Christopher Garft

(57) ABSTRACT

This disclosure describes a mounting platform comprising a retainer plate opening that includes a first opening profile at a top platform surface of the mounting platform and a second opening profile at a bottom platform surface of the mounting platform. the top platform surface first receives a retainer plate when nested within the mounting platform, and the bottom platform surface abuts the retainer plate when the retainer plate is nested within the mounting platform. The first opening profile matches a planform profile of the retainer plate and is etched into the top platform surface through to the bottom platform surface, and the second opening profile is etched from midway between the top platform surface and the bottom platform surface through to the bottom platform surface. The second opening profile corresponding to a rotational offset of the first opening profile by a predetermined angle.

12 Claims, 9 Drawing Sheets

Related U.S. Application Data

(60) Provisional application No. 62/855,699, filed on May 31, 2019.

(51) Int. Cl.
*F16M 13/00* (2006.01)
*H04M 1/11* (2006.01)

(52) U.S. Cl.
CPC .... *F16B 2200/99* (2023.08); *F16M 2200/024* (2013.01); *F16M 2200/028* (2013.01)

(58) Field of Classification Search
CPC .... F16B 1/00; F16B 21/04; F16B 7/20; F16B 5/10; F16B 5/0092
See application file for complete search history.

(56) References Cited

U.S. PATENT DOCUMENTS

| | | | |
|---|---|---|---|
| 3,477,261 A | 11/1969 | Siana | |
| 3,924,775 A | 12/1975 | Andreaggi et al. | |
| 4,047,821 A | 9/1977 | Hoke et al. | |
| 4,260,180 A | 4/1981 | Halushka et al. | |
| 5,018,901 A | 5/1991 | Ferree et al. | |
| D443,726 S | 6/2001 | Faillant-Dumas | |
| D475,417 S | 6/2003 | Wintersteiger | |
| D476,376 S | 6/2003 | Wintersteiger | |
| D526,973 S | 8/2006 | Gates et al. | |
| 7,226,321 B2 | 6/2007 | Uhari | |
| D558,208 S | 12/2007 | Ikeda et al. | |
| D558,209 S | 12/2007 | Ikeda et al. | |
| D575,289 S | 8/2008 | Kuo et al. | |
| 7,431,027 B2 | 10/2008 | Carpenter et al. | |
| D585,898 S | 2/2009 | Skurdal | |
| 7,518,855 B2 * | 4/2009 | Chu | F16M 11/16 248/125.1 |
| 8,040,032 B2 * | 10/2011 | Kovacs | H01J 5/56 439/336 |
| 8,148,701 B2 | 4/2012 | Yoder | |
| D680,541 S | 4/2013 | Lee et al. | |
| 8,552,403 B2 | 10/2013 | Yoder et al. | |
| D693,814 S | 11/2013 | Park | |
| D694,228 S | 11/2013 | Richter | |
| 8,608,502 B2 | 12/2013 | Witter et al. | |
| 8,708,151 B2 | 4/2014 | Whitten et al. | |
| D717,244 S | 11/2014 | Reishus et al. | |
| D739,857 S | 9/2015 | Lay et al. | |
| D749,442 S | 2/2016 | Jung et al. | |
| D749,504 S | 2/2016 | Jeong et al. | |
| D768,635 S | 10/2016 | Due | |
| D784,259 S | 4/2017 | Huang et al. | |
| D802,529 S | 11/2017 | Andersson | |
| D805,884 S | 12/2017 | Evitt | |
| 9,850,926 B2 * | 12/2017 | Buchanan | B62J 11/00 |
| D806,711 S | 1/2018 | Sakaguchi et al. | |
| 9,875,628 B2 * | 1/2018 | Pokrajac | G08B 13/2434 |
| D824,851 S | 8/2018 | Antonetti et al. | |
| D838,164 S | 1/2019 | Hanchett et al. | |
| D838,274 S | 1/2019 | Mittleman et al. | |
| D848,405 S | 5/2019 | Bould et al. | |
| 10,330,240 B1 | 6/2019 | Cho | |
| D859,363 S | 9/2019 | Chalabi et al. | |
| D859,364 S | 9/2019 | Chalabi et al. | |
| 10,419,054 B1 | 9/2019 | VanTassell et al. | |
| D864,961 S | 10/2019 | Sakaguchi et al. | |
| 10,436,914 B2 | 10/2019 | Gindraux et al. | |
| D878,353 S | 3/2020 | Heidrich | |
| D878,905 S | 3/2020 | Illouz | |
| D879,086 S | 3/2020 | Nahum et al. | |
| D882,439 S | 4/2020 | Fan | |
| 10,623,615 B2 | 4/2020 | Vestergren | |
| D886,795 S | 6/2020 | Tak et al. | |
| D888,017 S | 6/2020 | Yuan | |
| D888,687 S | 6/2020 | Xu et al. | |
| 10,694,012 B2 | 6/2020 | Krenn | |
| D890,160 S | 7/2020 | Heidrich | |
| 10,782,596 B2 | 9/2020 | Wilson | |
| D898,879 S | 10/2020 | Kalb et al. | |
| D906,280 S | 12/2020 | Matarese et al. | |
| D908,149 S | 1/2021 | Hansen et al. | |
| D911,155 S | 2/2021 | Kondo et al. | |
| 10,962,165 B2 | 3/2021 | Weng et al. | |
| D920,143 S | 5/2021 | Painter et al. | |
| D920,493 S | 5/2021 | Alexander | |
| D920,949 S | 6/2021 | Matarese et al. | |
| D921,474 S | 6/2021 | Borst | |
| 11,046,233 B1 * | 6/2021 | Royt | B60P 7/0807 |
| 2001/0000617 A1 | 5/2001 | Tracy | |
| 2010/0207769 A1 * | 8/2010 | Pokrajac | G08B 21/0286 235/492 |
| 2011/0114804 A1 | 5/2011 | Liu et al. | |
| 2011/0169616 A1 | 7/2011 | Yoder | |
| 2013/0181584 A1 | 7/2013 | Whitten et al. | |
| 2014/0158129 A1 | 6/2014 | Pratt, Jr. et al. | |
| 2016/0115978 A1 * | 4/2016 | Buchanan | F16B 2/08 248/220.22 |
| 2016/0177991 A1 | 6/2016 | Daniels et al. | |
| 2020/0378546 A1 | 12/2020 | Painter et al. | |

OTHER PUBLICATIONS

TmoNews T-Mobile Launches SyncUp Pets Tracker, publication date Feb. 26, 2020, (online) URL:https://www.tmonews.com/2020/02/t-mobile-syncup-pets-tracker/ (Year: 2020).

Design U.S. Appl. No. 29/693,289, Notice of Allowance mailed Feb. 5, 2021, 21 pages.

Design U.S. Appl. No. 29/693,293, Ex Parte Quayle mailed Jun. 1, 2020, 15 pages.

Design U.S. Appl. No. 29/693,293, Notice of Allowance mailed Jan. 7, 2021, 22 pages.

Design U.S. Appl. No. 29/693,293, Notice of Allowance mailed Aug. 20, 2020, 10 pages.

Design U.S. Appl. No. 29/693,299, Notice of Allowance mailed Jan. 8, 2021, 28 pages.

Design U.S. Appl. No. 29/693,299, Notice of Allowance mailed Sep. 14, 2020, 18 pages.

Design U.S. Appl. No. 29/735,072, Notice of Allowance mailed Sep. 30, 2021, 103 pages.

U.S. Appl. No. 16/872,808, Final Office Action mailed Apr. 5, 2022, 26 pages.

U.S. Appl. No. 16/872,808, Notice of Allowance mailed Nov. 18, 2023, 31 pages.

U.S. Appl. No. 16/872,808, Office Action mailed Aug. 3, 2022, 28 pages.

U.S. Appl. No. 16/872,808, Office Action mailed Dec. 29, 2021, 48 pages; per EYC on Jan. 6, 2022 citation is not required in TM.P0860US or TM.D0868US. See email saved to SharePoint as confirmation.

U.S. Appl. No. 29/735,515, Notice of Allowance mailed Nov. 26, 2021, 34 pages.

* cited by examiner (Exploded Isometric View of Assembly Item 102)

(Section A-A of FIG. 2B)

(Section B-B of FIG. 2C)

(Section C-C of FIG. 2C)

(Section D-D of FIG. 3B)

(Section E-E of FIG. 3B)

DEVICE-TO-MOUNT ROTATIONAL COUPLING MOUNTING PLATFORM

CROSS-REFERENCE TO RELATED PATENT APPLICATIONS

This patent application is a divisional application of U.S. patent application Ser. No. 16/872,808, filed on May 12, 2020, and entitled "Device-to-Mount Rotational Coupling Mechanism", which claims the benefit of priority from U.S. Provisional Patent Application No. 62/855,699, filed on May 31, 2019, and titled "Device-to-Mount Rotational Coupling Mechanism," which are herein incorporated by reference in its entirety.

BACKGROUND

The conventional locking mechanism to secure an electronic device to a mounting platform typically operates on a double-action mechanism. A first action involves securing the electronic device to the mounting platform and the second action involves locking the electronic device in place. Similarly, separate and distinct actions may be required to unlock and remove the electronic device from the mounting platform.

The force and motion required to secure the electronic device in place are typically directed in a different direction to the force and motion required to lock the electronic device. In one example, securing the electronic device may require a horizontally-directed force, while locking the electronic device in place may require a vertically-directed force or a rotary force and motion. In these examples, the double act of un/securing and un/locking in electronic device can limit the flexibility and applicability of such locking mechanisms in particular use environments where the location of the electronic device is difficult to reach and/or may necessitate performing the double act of un/securing and un/locking the electronic device using one hand.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1A illustrates a side view of the device casing installed into the mounting platform. FIG. 1B illustrates an isometric view from above the device casing that depicts the device casing separated from the mounting platform. FIG. 1C illustrates an isometric view from below the mounting platform that depicts the device casing separated from the mounting platform.

FIG. 2A illustrates an exploded isometric view of the device casing and retainer plate assembly. FIG. 2B illustrates a side view of the device casing assembly. FIG. 2C illustrates a cross-sectional view of the device casing assembly through section A-A of FIG. 2B. FIG. 2D illustrates a cross-sectional view through section B-B of FIG. 2C. FIG. 2E illustrates a cross-sectional view through section C-C of FIG. 2C.

FIG. 3 illustrates an exemplary embodiment of a mounting platform that receives the retainer plate assembly of the device casing.

DETAILED DESCRIPTION

Figure 1A:
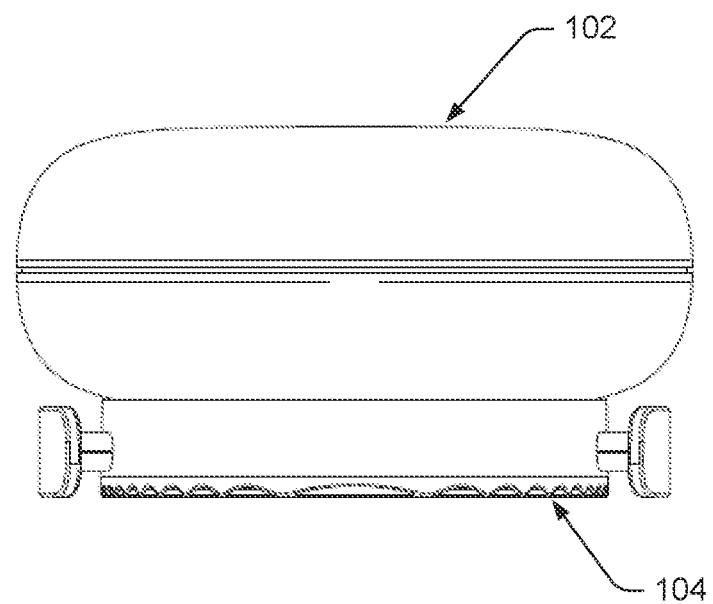
FIGS. 1A through 1C illustrate an assembly view of the device casing and the mounting platform.

This disclosure describes a rotational coupling mechanism for releasably coupling a device to a mounting platform. In one example, a user may nest a device within the mounting platform and perform a single rotation of the nested device to toggle between a locked position and an unlocked position. In a locked position, the device is restricted from translation relative to the mounting platform, however, the device may continue to rotate in a clockwise or counterclockwise direction to toggle between a locked and unlocked position. In an unlocked position, the device may disengage freely from the mounting platform and is thus subsequently free to move in any translational direction or about any rotational axis.

The rotational coupling mechanism, as described herein, provides for a single-rotational action that selectively couples, locks and unlocks a device relative to a mounting platform. The single-rotational action simplifies the number of user operations to couple and lock a device to the mounting platform. In other words, a user may choose to nest the device in the mounting platform and rotate the device in a clockwise direction until the device is in a locked position. The user may continue to rotate the device in the clockwise direction until the device is toggled to an unlocked position. Similarly, the user may nest the device in the mounting platform and rotate the device in an anti-clockwise direction until the device is in a locked position, and further continue to rotate the device in the anti-clockwise direction until the device is toggled to an unlocked position.

Rather than necessitating discrete actions to attach a device to a mounting platform and then lock the device to the mounting platform, the rotational coupling mechanism may perform both functions via a single-rotational action.

In various examples, the rotational coupling mechanism may facilitate mounting a mechanical device or an electronic device to a mounting platform. In one example, the device may correspond to an electronic tracking device that is used to track movements of a tracked item, such as a tangible product, an individual, or an animal. The mounting platform may correspond to a charging station or a mounting plate that is fixedly attached to the tracked item. For example, the device may be an electronic tracker that is releasably coupled to a product, person, or an animal via a mounting platform.

The rotational coupling mechanism comprises two parts, namely a retainer plate assembly that is fixed to the device casing and the mounting platform that is configured to receive the retainer plate assembly.

The rotational coupling mechanism is created by a surface abutment between a segment of the retainer plate assembly and a corresponding segment of a grooved-flange formed within the mounting platform. The coupling mechanism may be engaged by aligning the device casing into an aligned position relative to the mounting platform. The aligned position may correspond to an alignment of corners of the retainer plate assembly with etched openings in the grooved-flange of the mounting platform. Once in the aligned positioned, the device casing may be inserted into the mounting platform, which forces the retainer plate assembly to nest within the grooved flange of the mounting platform. Once inserted, a user may rotate the device casing, in a clockwise or counterclockwise direction, thereby rotating the retainer plate assembly within the grooved flange of the mounting platform, until the retainer plate assembly (and ultimately, the device casing) is engaged in a locked position. Further rotation of the device mount may cause the device casing to toggle into an unlocked position.

The opening of the mounting platform may be sized to receive the retainer plate assembly of the device casing in a particular orientation. For example, the retainer plate assembly of the device casing may have a square profile, and the opening of the mounting platform may be sized to receive the square profile. In some examples, the opening of the mounting platform may be oversized by a predetermined tolerance that suits the fitment of the retainer plate assembly within the mounting platform.

The mounting plate may further include a groove that is etched into the inner edge of the mounting plate that abuts the retainer plate assembly. The groove may be sized to accept the outermost dimension of the retainer plate assembly at any rotational orientation of the retainer plate assembly within the mounting plate. For example, consider a device casing with a square retainer plate assembly. In this example, the groove of the mounting plate may be sized to suit the diagonal length between non-adjacent corners of the retainer plate assembly (i.e. outermost dimension), such that the retainer plate assembly may rotate a full 360-degrees when inserted into the mounting bracket.

Moreover, the groove may be etched through a full thickness of the mounting plate at discrete positions that facilitate receipt of the retainer plate assembly into the mounting plate. Continuing with the previous example, a full thickness groove may be etched at positions that align with the corners of a square retainer plate assembly to facilitate receipt of the square retainer plate assembly. At all other circumferential positions, the groove may be etched through a partial thickness of the mounting plate, such that a flange is created to overlap a segment of the edge of the retainer plate assembly at particular orientations of the device casing within the mounting platform.

In various examples, an unlocked position of the device casing from the mounting platform corresponds to an alignment of the corners of the retainer plate assembly with the full thickness segments of the groove. Therefore, to uncouple the device casing from the mounting platform, a user may rotate the device casing in a clockwise or counterclockwise until the corners of the retainer plate assembly align with the full-thickness segment of the groove.

In contrast, a locked position corresponds to an overlap of the corners of the retainer plate assembly with the partial thickness segments of the groove. In this latter example, the flange created by the partial thickness segment of the groove prevents translation of the device casing relative to the mounting platform (i.e. locked position) by restricting the translation of overlapped edges of the retainer plate assembly.

This disclosure further describes a mechanically assisted coupling assembly that reduces the likelihood that the device casing is inadvertently rotated from a locked position to an unlocked position. The mechanically assisted coupling assembly comprises a plurality of wedges that protrude outward from the outermost dimension (i.e. corners) of the retainer plate assembly. The wedges may include mechanically assistance that biases the wedge to protrude outward from the retainer plate assembly. Thus, when the device casing is nested within the mounting platform, the outward protrusion of the wedges may force the wedges into notches etched into segments of the mounting platform. In some examples, the wedges may be positionally-offset above the outermost dimension of the retainer plate assembly. The wedges may be mechanically assisted by any type of device or source of force such as a coil compression spring, a magnetic latch, an elastic rubber, or any other elastic material or device.

In one example, consider a device casing within a mechanically assisted retainer assembly being inserted into a mounting platform. In this example, the wedges of the retainer assembly may be biased to protrude outward from the retainer plate assembly under the bias of a source of force, such as a coil compression spring. As the retainer plate assembly is inserted into the mounting plate platform, the wedges contact the surface of the groove (i.e. full-thickness groove when the retainer plate assembly is aligned with the mounting platform in the unlocked position) and wedges regress inwards into the retainer plate assembly. The inward regression causes the source of force associated with the wedges, such as the coil compression spring, to force the wedge outwards from the retainer plate assembly and toward the surface of the groove. When the retainer plate assembly of the device casing is rotated to align with a notch of the mounting platform, the wedge is configured to protrude into the notch under the force of the coil compression spring, thus locking the retainer plate assembly in place.

To unlock the retainer plate assembly from the mounting plate, a user may apply a sufficient rotational force to the device casing (i.e. retainer plate assembly) that causes the wedge to move out of the notch and regress inward into the retainer plate assembly.

The rotational stiffness of the locking mechanism can be impacted by the stiffness of the mechanism used to force the wedge outward and into the notch of the mounting platform. In one example, the rotational stiffness of the locking mechanism can be increased by increasing the stiffness of the coil compression spring, or by increasing the amount the spring is compressed as it moves from a locked position (i.e. within a notch) to an unlocked position (i.e. outside the notch profile), or a combination of both. In another example, the rotational stiffness can be further increased by increasing the number of wedges that engage with notches when in the locked position.

In the illustrated example, the retainer plate assembly of the device casing may include openings at each outermost dimension (i.e. corner) to receive the wedges. The openings may be adapted to mirror a profile of the wedges such that the wedges can project through the openings and outward from the retainer plate assembly. The wedges may include a protruding end and a non-protruding end. The protruding end may protrude through the opening of the retainer plate assembly. The non-protruding end may include a flange that prevents the wedge from entirely protruding outward through, and entirely disengage from, the opening of the retainer plate assembly. In some examples, the wedge may correspond to a pin, a spire, a pyramid shape, a lever, or any other shape that is adapted to project outward from the retainer plate assembly.

Moreover, the mounting platform may include a plurality of notches etched into segments of the partial-thickness groove of the retainer plate assembly. The notches may be sized to receive the wedges of the retainer plate assembly.

Each notch may be positioned, circumferentially, to align with corners of a retainer plate assembly (i.e. positions of the wedges) when the device casing is inserted into the mounting platform. The notches may be sized to mirror the shape and size of a fraction of each wedge that touches the notch. The depth of the notch may mirror at least a segment of the wedge that protrudes outward from the retainer plate assembly.

In various examples, the mechanically assisted coupling assembly may include a different number of wedges relative to the number of notches. In one example, the number of notches on the mounting platform may correspond to the number of wedges on the retainer plate assembly. In other examples, the number of notches may be fewer or more than the number of wedges of the retainer plate assembly. For example, consider a triangle-shaped retainer plate assembly with three wedges fixed at each of the three corners. While the triangle-shaped retainer plate assembly may include up to three wedges, the mounting platform may include any number of notches. By introducing more than three notches, the rotation of the device casing from a locked position to an unlocked position can be reduced.

Figure 1B:
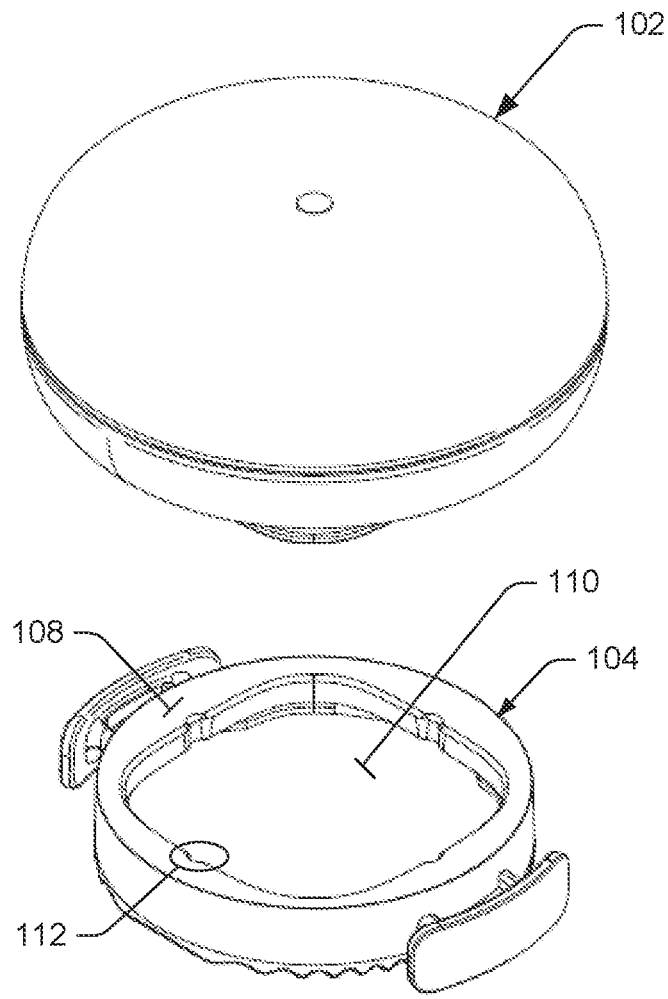
Figure 1C:
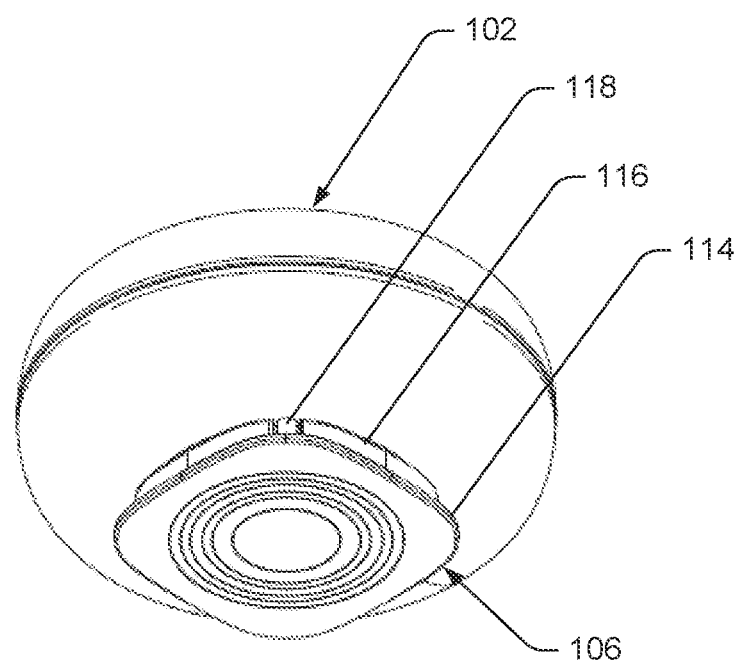
Figure 1C:
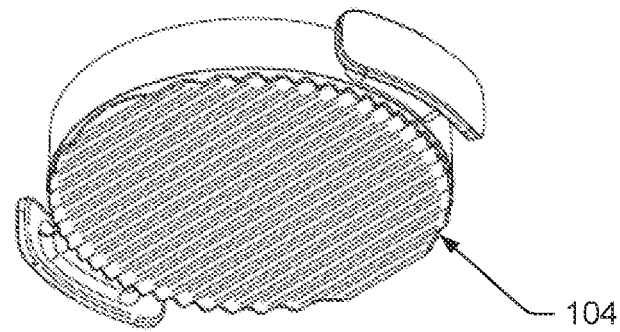

FIGS. 1A through 1C illustrate an assembly view of the device casing 102 and the mounting platform 104. FIG. 1A illustrates a side view of the device casing 102 installed into the mounting platform 104. FIG. 1B illustrates an isometric view from above the device casing 102 that depicts the device casing 102 separated from the mounting platform 104. FIG. 1C illustrates an isometric view from below the mounting platform 104 that depicts the device casing 102 separated from the mounting platform 104.

In the illustrated example, the device casing 102 is to comprise of two dome-shaped segments that join at their respective edges. The device casing 102 may be fabricated from anodized aluminum, aluminum, titanium, brass, iron, steel, stainless steel, composite materials, or polypropylene plastic. Further device casing 102 may be sized to house an electronic device, such as an electronic tracker is intended to be releasably coupled to a product, person, or an animal via a mounting platform. It is noteworthy that the device casing 102 may be configured to house any type of electronic device that is capable of being installed within the enclosure formed by the two dome-shaped segments.

Referring to FIGS. 1B and 1C, the mounting platform 104 may be sized to receive the device casing 102 and facilitate a locking and unlocking mechanism of the device casing 102, once installed. The mounting platform 104 may be fabricated from anodized aluminum, aluminum, titanium, brass, iron, steel, stainless steel, composite materials, or polypropylene plastic.

In the illustrated example, the mounting platform 10 may include a recessed segment that is sized to receive a retainer plate assembly 106 that is fixedly attached to the device casing 102. The recessed segment extends from a top platform surface 108 of the mounting platform 104 to a bottom platform surface 110. The recessed segment further includes a partially flanged wall along the recessed perimeter, which provides the mechanical mechanism to restrict translation of the retainer plate assembly 106—at particular orientations of the retainer plate assembly 106 relative to the mounting platform 104—once the retainer plate assembly 106 is nested within the mounting platform 104. Further, the partially flanged wall also provides the mechanical mechanism that permits ingress and egress of the retainer plate assembly 106—and attached device casing 102—to and from the mounting platform 104.

Moreover, the mounting platform 104 may further include one or more notches 112 that are etched into the top platform surface 108. The one or more notches 112 may be etched into a segment of the partially flanged wall that has a flanged wall profile. The one or more notches 112 may be positioned on the top platform surface 108 so as to receive one or more wedges that protrude outward from the retainer plate assembly 106 of the device casing 102. In one example, the number of notches may correspond to the number of wedges. Alternatively, the number of notches may be less than or greater than the number of wedges.

The retainer plate assembly 106 may comprise a flat plate segment 114 that is offset away from the device casing 102 by a perimeter wall flange 116 that extends along the perimeter edge of the flat plate segment 114. The retainer plate assembly 106 may be fabricated from anodized aluminum, aluminum, titanium, brass, iron, steel, stainless steel, composite materials, or polypropylene plastic.

In the illustrated example, the retainer plate assembly 106 may be rigidly attached to the device casing 102 at the abutting top edge of the perimeter wall flange 116. The retainer plate assembly 106 may further include one or more perimeter flange openings that facilitate one or more wedges 118 to protrude outward from the center of the retainer plate assembly 106. The perimeter flange openings may be positioned at the corner edges of the retainer plate assembly 106 so as to align with corresponding notches in the mounting platform 104 when the device casing 102 nests within the mounting platform 104. In various examples, the one or more wedges 118 may be fabricated from a durable polypropylene plastic or composite material.

Figure 2A:
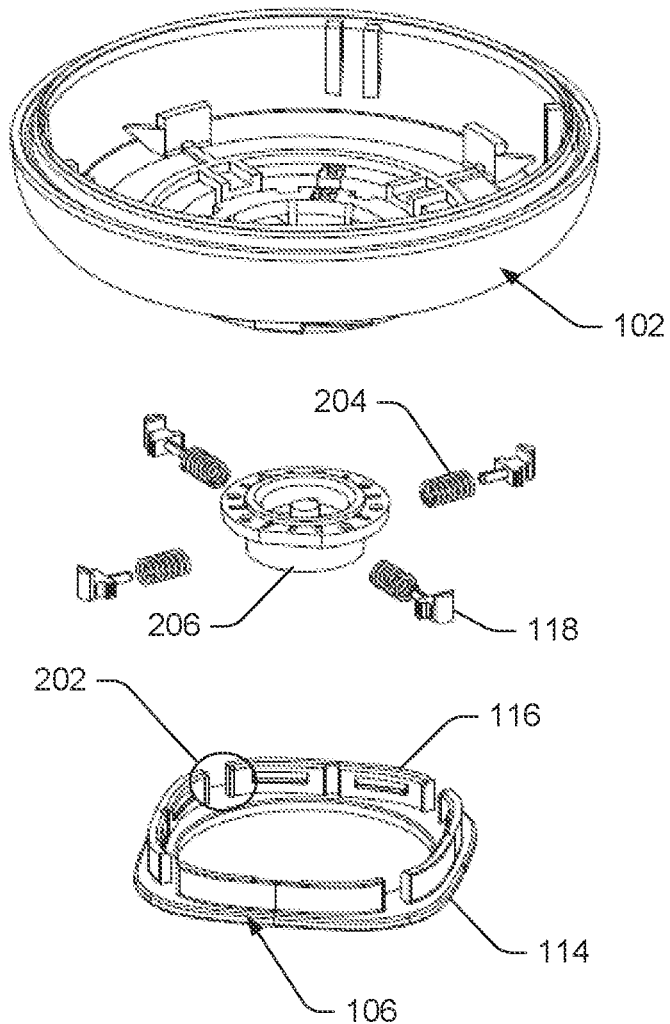
FIGS. 2A through 2E illustrate an exemplary embodiment of a device casing assembly that comprises a retainer plate assembly that is rigidly fixed to a device casing.
Figure 2B:
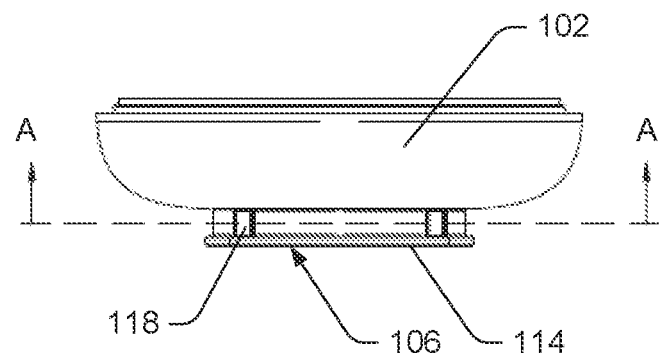
Figure 2C:
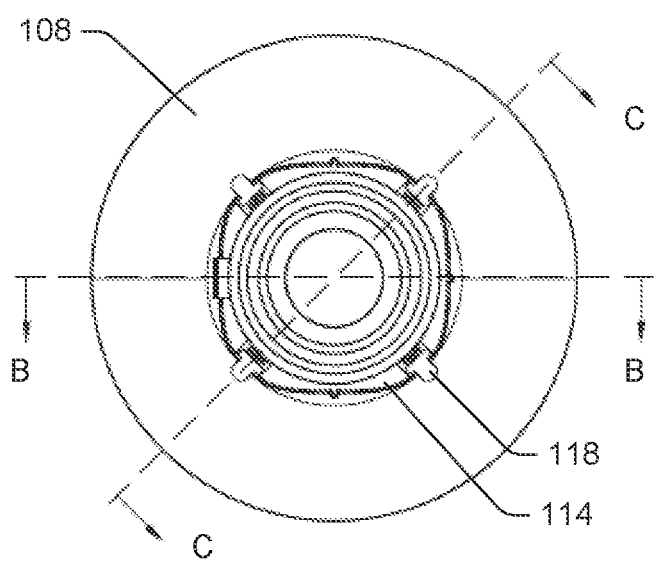
Figure 2D:
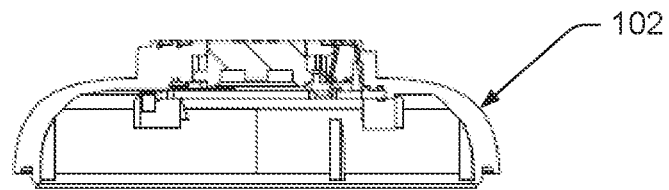
Figure 2E:
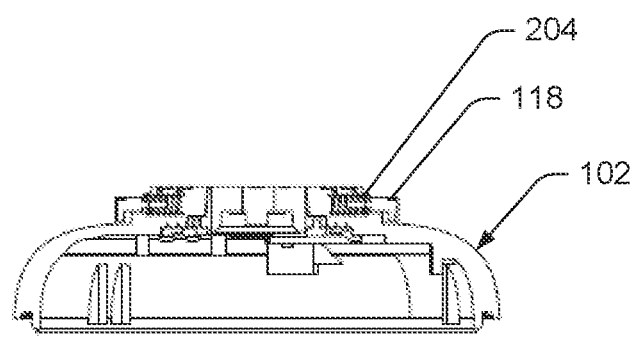
Figure 3A:
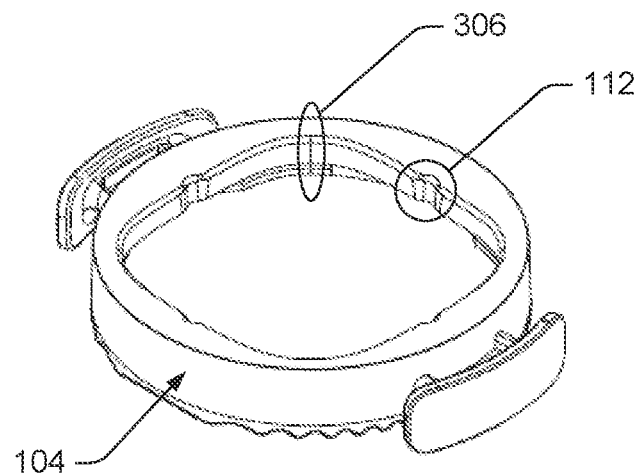
FIG. 3A illustrates an isometric view of the mounting platform.
Figure 3B:
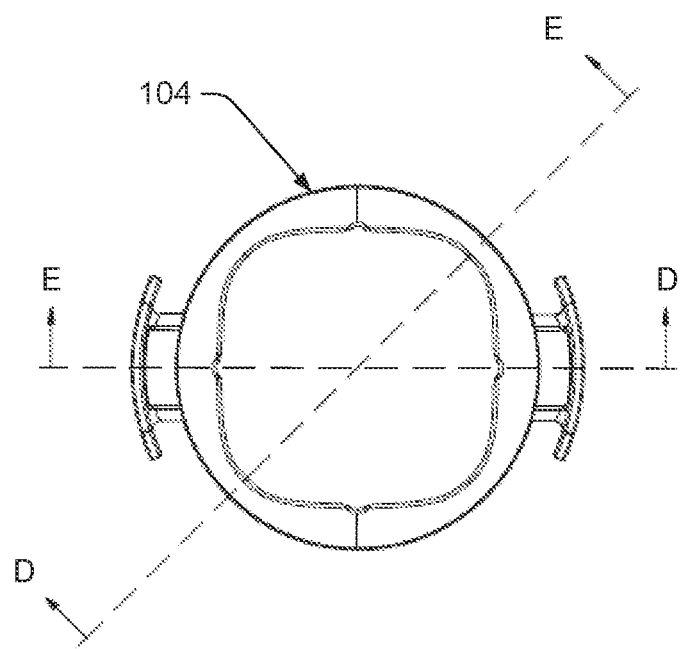
FIG. 3B illustrates a top planform view of the mounting platform.
Figure 3C:
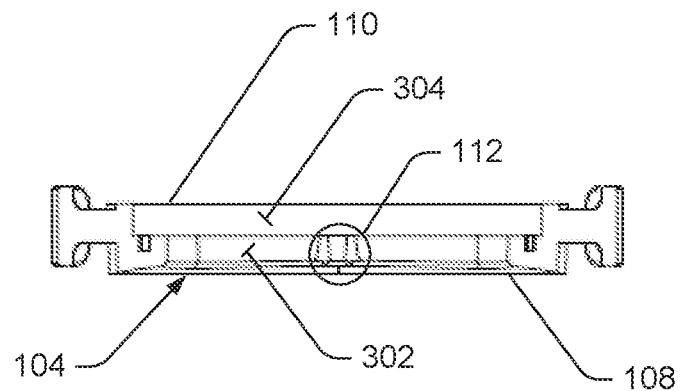
FIG. 3C illustrates a cross-sectional view through section D-D of FIG. 3B.
Figure 3D:
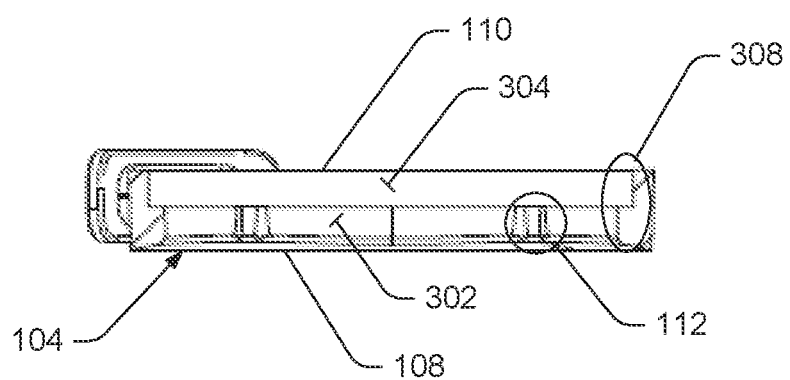
FIG. 3D illustrates a cross-sectional view through section E-E of FIG. 3B.

FIGS. 2A through 2E illustrate an exemplary embodiment of a device casing 102 that comprises a retainer plate assembly 106 that is rigidly fixed to a device casing 102. FIG. 2A illustrates an exploded isometric view of the device casing 102 and retainer plate assembly 106. FIG. 2B illustrates a side view of the device casing 102. FIG. 2C illustrates a cross-sectional view of the device casing assembly through section A-A of FIG. 2B. FIG. 2D illustrates a cross-sectional view through section B-B of FIG. 2C. FIG. 2E illustrates a cross-sectional view through section C-C of FIG. 2C.

In the illustrated example, the device casing 102 comprises one dome-shaped segment of an entire device casing, within which an electronic device, such as a pet tracker, may be installed.

The retainer plate assembly 106 may comprise a flat plate segment 114 that is offset away from the device casing 102 by a perimeter wall flange 116 that extends along the perimeter edge of the flat plate segment 114. The retainer plate assembly 106 is rigidly attached to the device casing at the abutting top edge of the perimeter wall flange 116. The perimeter wall flange 116 is offset inward from the outer edge of the flat plate segment 114, thereby creating a lipped edge, which is used to engage the mounting platform when the device casing, and retainer plate assembly 106 nests within the mounting platform. In the illustrated example, the planform profile of the flat plate segment 114 may correspond to a square profile. In other examples, planform profile of the flat plate segment 114 may correspond to a rectangular profile or a triangular profile, or any other closed section profile.

Further, the perimeter wall flange 116 may include one or more perimeter flange openings 202 to facilitate one or more wedges 118 to protrude outward from the center of the retainer plate assembly 106. The perimeter flange openings 202 may be positioned at the corner edges of the retainer plate assembly 106 so as to align with corresponding notches in the mounting platform when the device casing 102 nests within the mounting platform 104.

In the illustrated example, the one or more wedges 118 may have a rectangular cross-sectional profile. In other examples, the one or more wedges 118 may have a cross-sectional profile that corresponds to a square, a pin, a spire, or a pyramid. The one or more wedges may comprise a protruding end and a non-protruding end. The protruding end is designed with a cross-sectional profile that is sized to protrude through the perimeter flange openings 202 of the perimeter wall flange 116. The non-protruding end is designed to incorporate a flange that is wider than the perimeter flange openings, thereby preventing the individual wedges from protruding entirely through the perimeter flange openings when under the force of the mechanical springs 204.

Additionally, the one or more wedges 118 may be mechanically coupled to the retainer plate assembly 106 via mechanical springs 204. The mechanical springs 204 may generate an axial force when compressed that cause the one or more wedges 118 to protrude outward through the perimeter flange openings 202 in the perimeter wall flange 116.

In the illustrated example, a flanged mount 206 is rigidly fixed to a bottom surface of the device casing 102 and is designed to provide mechanical springs 204 associated with one or more wedges 118 with a fixed surface upon which the mechanical spring coils may compress to generate an axial force that causes the one or more wedges 118 to protrude outward through the perimeter flange openings 202 in the perimeter wall flange 116 of the retainer plate assembly 106.

FIG. 3 illustrates an exemplary embodiment of a mounting platform that receives the retainer plate assembly 106 of the device casing 102. FIG. 3A illustrates an isometric view of the mounting platform 104. FIG. 3B illustrates a top planform view of the mounting platform 104. FIG. 3C illustrates a cross-sectional view through section D-D of FIG. 3B. FIG. 3D illustrates a cross-sectional view through section E-E of FIG. 3B.

In the illustrated example, the mounting platform 104 includes a top platform surface 08 and a bottom platform surface 110. The top platform surface 108 is etched to receive a first opening profile 302 that corresponds to the planform of the retainer plate assembly 106. The first opening profile 302 is etched into the top platform surface 108 through to the bottom platform surface 110. The bottom platform surface 110 (i.e. the floor of the recess) corresponds to the surface that the retainer plate assembly 106 abuts when nested within the mounting platform 104.

Further, the mounting platform 104 is further etched to receive a second opening profile 304 that corresponds to the planform of the retainer plate assembly 106. The second opening profile 304 is etched from a midway point between the top platform surface and the bottom platform surface 110. While the centroid of the second opening profile 304 is colinear with the centroid of the first opening profile 302, the alignment of the second opening profile 304 relative to the first opening profile 302 is rotationally offset by a predetermined angle.

The rotational offset is intended to etch a groove within the wall of the mounting platform 104 that permits the flat plate segment 114 of the retainer plate assembly 106 to rotate 360 degrees when the retainer plate assembly 106 is nested within the mounting platform 104. The rotational offset is governed by the predetermined angle that defines the offset required to etch the groove that permits the rotation of the retainer plate assembly 106 within the etched groove. In one example, the predetermined angle is defined as 180 (degrees) divided by the number of corners on the flat plate segment 114 of the retainer plate assembly 106. For example, consider a flat plate segment 114 having a square profile. In this example, the predetermined angle would equate to 45 degrees (i.e. 180 degrees/4). Similarly, a flat plate segment 114 having a triangular profile would require the second opening profile 304 to be rotationally offset relative to the first opening profile 302 by 40 degrees (i.e. 120 degrees/3). Doing so will permit the triangular profile of the flat plate segment 114 to rotation 360 degrees when the retainer plate assembly 106 is nested within the mounting platform 104.

The mounting platform 104 further includes a partially flanged wall that encloses the first opening profile 302 and the second opening profile 304. The partially flanged wall is created by the overlay and rotational offset of the combined first opening profile 302 and the second opening profile 304. The partially flanged wall comprises a first segment having a straight wall profile 306 and a second segment having a flanged wall profile 308. The flange of the flanged wall profile 308 restricts translation of the retainer plate assembly 106 relative to the mounting platform 104 while the retainer plate assembly 106 is nested within the mounting platform 104. More specifically, translation of the retainer plate assembly 106 is restricted at a first set of predetermined orientations of the retainer plate assembly 106 relative to the mounting plate 104. The set of predetermined orientations correspond to corner edges of the retainer plate assembly 106 aligning with the second segment of the partially flanged wall that has a flanged wall profile 308.

In contrast, the retainer plate assembly 106 is free to translate into and out of the mounting platform 104 when the retainer plate assembly 106 is oriented above the mounting platform 104 at a second set of predetermined orientation. The second set of predetermined orientations corresponds to corner edges of the retainer plate assembly 106 aligning with the first segment of the partially flanged wall that has a straight wall profile 306.

Moreover, the mounting platform 104 may further include one or more notches 112 that are etched into the top platform surface 108 of the mounting platform 104. The one or more notches 112 may be etched into the second segment of the partially flanged wall that has a flanged wall profile 308. The one or more notches 112 are etched to receive one or more wedges that protrude outward from the retainer plate assembly 106 of the device casing 102.

In one example, the number of notches may correspond to the number of wedges. Alternatively, the number of notches may be less than or greater than the number of wedges.

Figure 4:
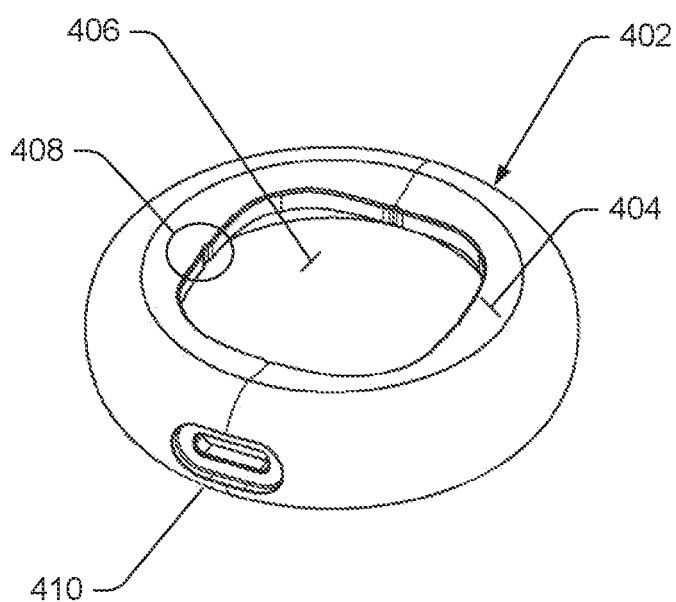
FIG. 4 illustrates an isometric view of an exemplary embodiment of a mounting platform that is further configured as a power charging station.

FIG. 4 illustrates an isometric view of an exemplary embodiment of the mounting platform 104 that is further configured as power charging station 402. The mounting platform 104 as described in FIGS. 1A through 1C and FIGS. 3A through 3E include various details relating to the power charging station 402. As such, for brevity and ease of description, various details relating to the power charging station 402 have been omitted herein to the extent that the same or similar details have been provided in relation to the mounting platform 104.

In the illustrated example, the power charging station 402 may include a recessed segment that is sized to receive a retainer plate assembly 106 that is fixedly attached to a device casing 102. The recessed segment extends from a top platform surface 404 of the power charging station 402 to a bottom platform surface 406. The recessed segment further includes a partially flanged wall along the recessed perimeter, which provide the mechanical mechanism to restrict translation of the retainer plate assembly 106—at particular orientations of the retainer plate assembly 106 relative to the power charging station 402—once the retainer plate assembly 106 is nested within the power charging station 402. Further, the partially flanged wall also provides the mechanical mechanism that permits ingress and egress of the retainer plate assembly 106—and attached device casing 102—to and from the power charging station 402.

The power charging station 402 may further include one or more notches 408 that are etched into the top platform surface 404. The one or more notches 408 may be similar to the one or more notches 112. The one or more notches 408 may be etched into a segment of the partially flanged wall that has a flanged wall profile, similar to the flanged wall profile 308. The one or more notches 112 may be positioned on the top platform surface 404 so as to receive one or more wedges that protrude outward from the retainer plate assembly 106 of the device casing 102.

The power charging station 402 may include, within its structure, hardware to draw power from the power input interface 410 and charge a device that is housed within the device casing 102 at times when the device casing 102 is nested within the power charging station 402. In various examples, the power charging station 402 may be configured to restrict charging of the device until the device casing 102 is in a locked position within the power charging station 402.

Further, the casing of the power charging station 402 may be fabricated from anodized aluminum, aluminum, titanium, brass, iron, steel, stainless steel, composite materials, or polypropylene plastic.

Conclusion

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A mounting platform, the mounting platform comprising:
    a retainer plate opening including a first opening profile at a top platform surface of the mounting platform and a second opening profile at a bottom platform surface of the mounting platform, wherein the top platform surface first receives a retainer plate when nested within the mounting platform, and wherein the bottom platform surface abuts the retainer plate when the retainer plate is nested within the mounting platform; and
    hardware that is configured to (i) draw power from a power input interface of the mounting platform, (ii) charge a device coupled to the retainer plate based on the retainer plate being in a locked position in the mounting platform, and (iii) restrict charging of the device coupled to the retainer plate based on the retainer plate not being in the locked position in the mounting platform,
    wherein the first opening profile matches a planform profile of the retainer plate, is defined by a first slice portion of the mounting platform that is from the top platform surface through to midway between the top platform surface and the bottom platform surface, and has a shape of a square with rounded corners,
    wherein the second opening profile is defined by a second slice portion of the mounting platform that is from midway between the top platform surface and the bottom platform surface through to the bottom platform surface, the second opening profile corresponding to a first rotational offset of the first opening profile about a center of the mounting platform by a first predetermined angle,
    wherein the first slice portion and the second slice portion define a straight wall that is from the top platform surface to the bottom platform surface, wherein the first slice portion and the second slice portion define a flanged wall that is from the top platform surface to the bottom platform surface and that is located at a second rotational offset of the straight wall about the center of the mounting platform by a second predetermined angle, and
    wherein an inner surface of the first slice portion defines multiple notches that are each configured to receive one or more wedges that protrude outward from the retainer plate and that are configured to maintain the retainer plate in the locked position in the mounting platform based on a subset of the multiple notches receiving the one or more wedges.

2. The mounting platform of claim 1, wherein the device is an electronic tracking device, and wherein the mounting platform is coupled to a mounting bracket that is attached to an item that is tracked by the electronic tracking device.

3. The mounting platform of claim 1, wherein the device is an electronic device, and wherein the mounting platform is part of a docking station for the electronic device.

4. The mounting platform of claim 1, wherein the flanged wall is further sized to prevent translation of the retainer plate of the device casing in response to the retainer plate being locked into the mounting platform.

5. The mounting platform of claim 1, wherein the straight wall is sized to create a planform to receive the retainer plate.

6. The mounting platform of claim 1, wherein a thickness of the first slice portion is sized to permit a clockwise rotation and anti-close rotation of the retainer plate when the retainer plate is nestled within the mounting platform.

7. The mounting platform of claim 6, wherein the retainer plate is nestled within the mounting platform in a position underneath flanges of the first slice portion.

8. The mounting platform of claim 1, wherein the first opening profile of the retainer plate opening matches a square planform profile or a rectangular planform profile of the retainer plate.

9. The mounting platform of claim 1, wherein the one or more wedges of the retainer plate are elastically retained in the one or more notches of the top platform surface by mechanical springs that coupled the one or more wedges to the retainer plate.

10. The mounting platform of claim 1, wherein the one or more notches of the inner surface of the first slice portion are to receive the one or more wedges of the retainer plate in which each wedge has a cross-sectional profile that corresponds to a pin, a spire, or a pyramid.

11. The mounting platform of claim 1, wherein:
    the first rotational offset is equal to the second rotational offset, and
    first predetermined angle is equal to the second predetermined angle.

12. The mounting platform of claim 1, wherein:
    the one or more notches are located in parts of the first slice portion that define the flanged wall.

* * * * *